(12) United States Patent
Kraus et al.

(10) Patent No.: US 8,141,695 B2
(45) Date of Patent: Mar. 27, 2012

(54) CLEAN CONVEYOR SENSING SYSTEM

(75) Inventors: Paul R. Kraus, Apple Valley, MN (US); Stefan Seemeyer, Solingen (DE)

(73) Assignee: Ecolab USA Inc., St. Paul, MN (US)

( * ) Notice: Subject to any disclaimer, the term of this patent is extended or adjusted under 35 U.S.C. 154(b) by 7 days.

(21) Appl. No.: 12/696,439

(22) Filed: Jan. 29, 2010

(65) Prior Publication Data

US 2011/0186406 A1 Aug. 4, 2011

(51) Int. Cl.
*B65G 45/22* (2006.01)
(52) U.S. Cl. ............. 198/502.1; 198/495; 198/496
(58) Field of Classification Search .......... None
See application file for complete search history.

(56) References Cited

U.S. PATENT DOCUMENTS

| | | | |
|---|---|---|---|
| 5,323,230 A * | 6/1994 | Hirashima | 356/446 |
| 5,363,968 A * | 11/1994 | Soloman | 209/546 |
| 5,758,761 A | 6/1998 | Selbertinger et al. | |
| 5,849,183 A * | 12/1998 | Ota et al. | 210/167.02 |
| 6,302,263 B1 | 10/2001 | Bennett et al. | |
| 6,360,874 B1 | 3/2002 | Virippil et al. | |
| 7,234,586 B1 * | 6/2007 | Newman | 198/495 |
| 2003/0168317 A1 * | 9/2003 | Fromme et al. | 198/502.1 |

FOREIGN PATENT DOCUMENTS

| | | |
|---|---|---|
| JP | 1320453 A | 12/1989 |
| WO | 0058186 A1 | 10/2000 |

OTHER PUBLICATIONS

Bley et al., "Methods for Qualitative and Quantitative Analysis of Lubricants and Contamination on Formed Surfaces", In: Proceedings of the 6th Conference on Sheet Metal, Enschede, The Netherlands, 1998, 10 pages.
Notification of Transmiittal of the International Seach Report and the Written Opinion of the Intenational Searching Authority, or Declaration for corresponding application No. PCT/IB2011/050328, mailed Aug. 25, 2011, 8 pp.

* cited by examiner

*Primary Examiner* — Kavel Singh
(74) *Attorney, Agent, or Firm* — Shumaker & Sieffert, P.A.

(57) ABSTRACT

A conveyor maintenance system and method determines when a conveyor requires cleaning by determining when the conveyor is soiled beyond a predetermined threshold level. The system comprises a detector that collects optical data indicative of the amount of soil on a conveyor, a memory that stores reference data indicative of a clean conveyor, and a controller that compares the optical data indicative of the amount of soil on the conveyor to the reference data and determines whether the conveyor requires cleaning based on the comparison.

18 Claims, 4 Drawing Sheets

CLEAN CONVEYOR SENSING SYSTEM

TECHNICAL FIELD

The invention relates to maintenance of a conveyor system.

BACKGROUND

Conveyor systems are used extensively in many industries to move materials from one location to another efficiently and effectively. Regular maintenance is required to maintain proper function of the conveyor systems. For example, in the case of chain conveyor systems that include a metal conveyor comprising a plurality of chain links, proper lubrication and cleaning is required to reduce the amount of friction between different components of the conveyor system, such as between the links of the chain.

Generation of soil on a conveyor is caused by abrasion between the conveyor and the cargo that it carries, as well as by external factors, such as dust. If the conveyor is not cleaned consistently, the amount of friction between components of the conveyor system increases, causing the efficiency of the conveyor system to decrease or maintenance problems to occur. Additionally, the soil may be transferred to the cargo carried by the conveyor.

Generally, the cleaning schedule for a conveyor is determined on a time-based schedule. For example, the conveyor may be cleaned every week, every two weeks, once a month, etc. The conveyor may also be cleaned at a time subjectively determined by an operator. The frequency of cleaning may depend upon one or more factors such as the cargo carried by the conveyor, the speed of the conveyor, the total amount of time the conveyor is up and running or the environment in which the conveyor is installed.

SUMMARY

In one example, the disclosure is directed to a method comprising collecting data related to at least one optical parameter from a conveyor, comparing the data to reference data related to the at least one optical parameter, and determining whether the conveyor requires cleaning based on the comparison.

In another example, the disclosure is directed to a system comprising a detector that collects optical data related to at least one optical parameter from a conveyor, a memory that stores reference data, and a controller that compares the optical data to the reference data, and determines whether the conveyor requires cleaning based on the comparison.

The details of one or more embodiments of the invention are set forth in the accompanying drawings and the description below. Other features, objects and advantages of the invention will be apparent from the description and drawings, and from the claims.

DETAILED DESCRIPTION

In general, the disclosure is directed to a maintenance system and method for conveyor systems that determines when a conveyor requires cleaning based on the amount of soil on the conveyor. The maintenance system determines when a conveyor requires cleaning by determining when the conveyor is soiled beyond a particular threshold level. In some examples, the maintenance system includes a sensor that senses the position of the conveyor and a detector that collects data based on the position of the conveyor. The data may be related to an optical parameter that corresponds to the amount of soil on the conveyor. In other examples, the sensor senses data related to passage of time and the detector collects data when a particular amount of time has elapsed. The maintenance system also includes a controller that analyzes the data to determine whether the conveyor requires cleaning.

Figure 1:
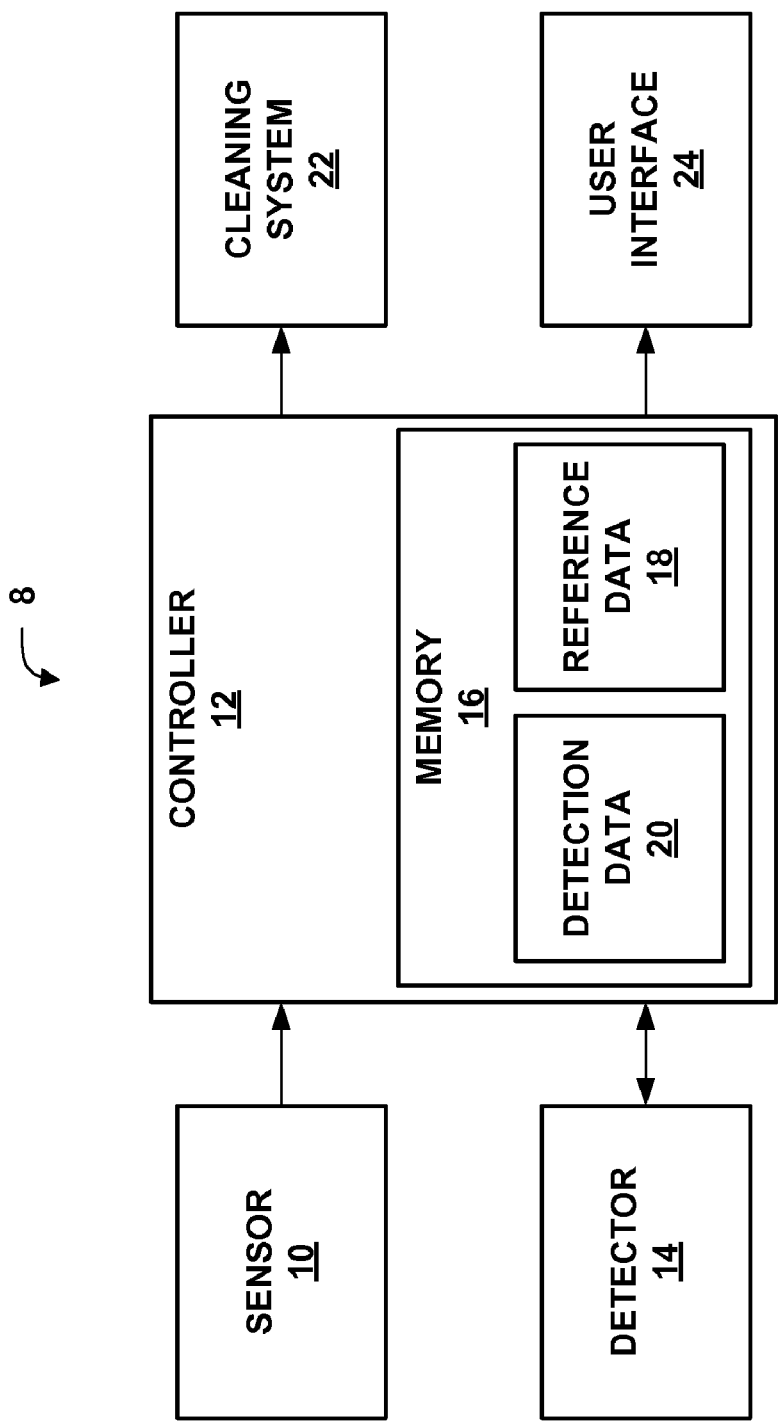
FIG. 1 is a block diagram illustrating a conveyor maintenance system that determines when a conveyor requires cleaning.

FIG. 1 is a block diagram illustrating an example maintenance system 8 that determines when a conveyor requires cleaning. Maintenance system 8 comprises a sensor 10, a controller 12, a detector 14, a cleaning system 22 and a user interface 24. Controller 12 includes a memory 16, which includes a reference data module 18 and a detection data module 20.

In some examples, sensor 10 collects data related to the position of a conveyor. For example, sensor 10 may comprise an inductive or capacitive sensor that emits an electromagnetic or electrostatic field and senses changes in the field related to the proximity of a particular component of the conveyor system to sensor 10. As another example, sensor 10 may comprise an optical sensor, e.g., an opto-interrupter, that detects changes in reflectivity of a surface of the conveyor that may be indicative of movement or rotation of the conveyor. Alternatively or additionally, sensor 10 may collect data related to the passage of time. For example, sensor 10 may comprise a time-keeping device such as a clock or a timer.

Controller 12 receives the data from sensor 10, analyzes the data and instructs detector 14 to collect optical data based on the analysis. Controller 12 may receive data from sensor 10 and determine that the conveyor has rotated to a position or has rotated a distance that is desirable for collecting optical data related to the amount and/or composition of soil on the conveyor. For example, controller 12 may instruct detector 14 to collect optical data based on a determination that the conveyor has rotated to a particular position with respect to detector 14. In other examples, controller 12 may receive data from sensor 10 that indicates that a predetermined amount of time has elapsed and instruct detector 14 to collect optical data when the predetermined amount of time has elapsed.

Detector 14, in some examples, may be a red/green/blue (RGB) detector that collects optical data related to the relative amounts of red, green and blue for a particular portion of the conveyor that may be indicative of the amount and/or composition of soil on the conveyor. In other examples, detector 14 may be a grayscale detector that collects optical data related to the intensity of a particular portion of the conveyor expressed within a given range between a minimum (e.g., black) and a maximum (e.g., white). For example, the grayscale may range from 0=black to 256=white for a 4-bit grayscale. The grayscale reading may be indicative of the amount and/or composition of soil on the conveyor. In other examples, detector 14 may be a camera that captures optical data in the form of an image of a particular portion of the conveyor.

Regardless of the particular type of detector 14 employed, controller 12 receives the optical data from detector 14 and determines whether the conveyor requires cleaning based on an analysis of the optical data. Controller 12 may compare the optical data received from detector 14 to reference data 18. Reference data 18 may include, for example, optical data acquired at a time when the conveyor was "clean." More specifically, controller 12 may generate a metric related to an optical parameter from the optical data and compare the metric to a corresponding metric from reference data 18. If the difference in the metrics satisfies a threshold, controller 12 may determine that the conveyor requires cleaning.

In some examples, controller 12 may determine an average value from optical data collected from more than one portion of the conveyor in order to eliminate any anomalies present in the optical data, and may use the average value in order to determine whether the conveyor requires cleaning. For example, controller 12 may instruct detector 14 to capture a plurality of samples of optical data indicative of the amount of soil on the conveyor at a selected frequency and/or for a predetermined amount of time. Controller 12 may store the plurality of samples of optical data as detection data 20. Once a particular number of samples have been collected and/or the predetermined amount of time has elapsed, controller 12 may access detection data 20 and generate one or more metrics for the optical data from each sample. Controller 12 may determine an average value of the metrics from a particular number of samples and determine whether the conveyor requires cleaning based on the average value by comparing the average value to reference data 18. In other examples, controller 12 may determine a maximum value, a minimum value, a mean value and/or a range of values of the optical data samples, and may use these in various ways to quantify the amount of soil on the conveyor. Those of skill in the art will readily appreciate that although particular examples of quantifying the amount of soil on the conveyor using optical detection are described herein, the invention is not limited in this respect, and that there are many ways known in the art to sample and quantify optical data.

If controller 12 determines that the conveyor requires cleaning, controller 12 may activate cleaning system 22 to automatically initiate a cleaning cycle. Cleaning system 22 may comprise a lubrication system or any other system that may be effective in cleaning the conveyor. Cleaning system 22 may be fully or partially automatic.

Alternatively or in addition, controller 12 may generate an electronic communication to alert a user that the conveyor requires cleaning (or to alert a user that a cleaning cycle was automatically initiated). For example, controller 12 may generate a local visual or audible alert on user interface 24, or may generate an electronic communication that is sent to a remotely located external device such as a networked computer, cell phone, personal digital assistant, pager or other communication device via e-mail, voice mail, text message, page, etc.

Figure 2:
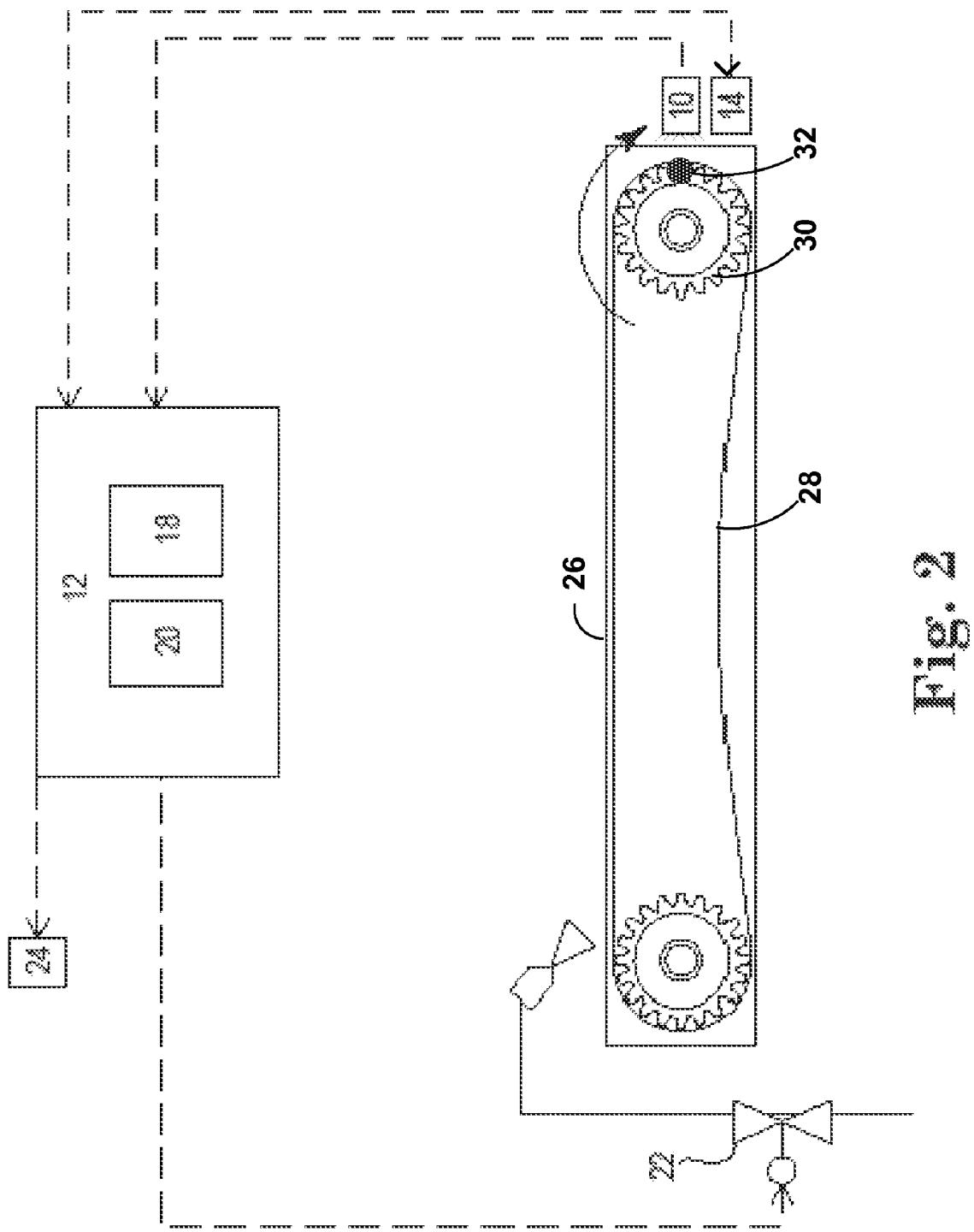
FIG. 2 is a diagram illustrating a conveyor system and a maintenance system that determines when the conveyor requires cleaning.

FIG. 2 is a diagram illustrating an example conveyor system 26 and an example maintenance system 8 (FIG. 1). In this example, conveyor system 26 includes a conveyor 28 and a drive shaft 30. Drive shaft 30 is positioned inside conveyor 28 and causes conveyor 28 to rotate. However, it shall be understood that other types of conveyor systems may also be used, and that the invention is not limited in this respect.

In some examples, sensor 10 captures data indicative of whether the conveyor is in an appropriate position for detector 14 to capture the optical data indicative of the amount of soil on the conveyor. In this case, sensor 10 is positioned with respect to conveyor system 26 such that data concerning the current conveyor position may be detected. Controller 12 may determine the current conveyor position from sensor data captured with respect to the conveyor itself. Alternatively, controller 12 may infer the current conveyor position from sensor data captured with respect to one or more other portions of the conveyor system such as the drive shaft 30. When the data from sensor 10 indicates that the conveyor is in an appropriate position, controller 12 may instruct detector 14 to capture optical data indicative of the amount of soil on the conveyor.

In the examples where sensor 10 captures data indicative of conveyor position, sensor 10 may be an inductive sensor, a capacitive sensor, an optical sensor, such as an opto-interrupter, that detects when a beam is either broken or detected by conveyor 28, an optical sensor that detects position of a marker or physical characteristic of conveyor 28, a physical sensor triggered by physical contact with some portion of conveyor 28 or marker placed on or connected to conveyor 28, or other sensor capable of detecting conveyor position.

In the case where the sensor 10 is an inductive, capacitive or magnetic sensor, a particular portion of drive shaft 30 may be equipped with object 32 that changes the electromagnetic or electrostatic field produced by sensor 10. Consequently, sensor 10 may sense a change in the field when the particular portion of drive shaft 30 equipped with object 32 rotates into proximity with sensor 10. The change in the field may be indicative of conveyor 28 having rotated a particular amount, and controller 12 may instruct detector 14 to collect optical data indicative of the amount of soil on the conveyor when conveyor 28 has rotated the particular amount. In some examples, multiple portions of drive shaft 30 may be equipped with objects 32 and controller 12 may instruct detector 14 to collect optical data more than once per revolution of drive shaft 30.

In other examples, rather than or in addition to sensing conveyor position, sensor 10 is a time-keeping device such as a clock or a timer.

Controller 12 receives and analyzes data collected by sensor 10 in order to determine whether the conveyor is in an appropriate position for detector 14 to collect optical data indicative of the amount of soil on the conveyor. For example, controller 12 may receive data from sensor 10 that indicates that object 32 has rotated into proximity with sensor 10. In other examples, controller 12 may receive data from sensor 10 that indicates that the conveyor is an appropriate position. Controller 12 may then instruct detector 14 to collect optical data from conveyor 28 because a particular portion, e.g., an opening between the links, of conveyor 28 has rotated into proximity with detector 14. In other examples, controller 12 may instruct detector 14 to collect optical data from conveyor 28 because a particular amount of time has elapsed.

As shown in FIG. 2, detector 14 is positioned beneath sensor 10. However, in other examples, detector 14 may be positioned above sensor 10, on the opposite side of conveyor system 26 as sensor 10, or at any position that may allow detector 14 to collect optical data from conveyor 28. In other examples, detector 14 and sensor 10 may be contained within the same housing.

As discussed with respect to FIG. 1, in some examples, detector 14 may comprise a RGB detector, which comprises a photodiode, i.e., a circuit element that converts light into current or voltage, coupled to red, green and blue filters. The red, green, and blue filters allow the photodiode to generate data based on the amount and distribution of red, green, and blue within a particular data sample, e.g., within a particular portion of conveyor 28. The amount and distribution of red, green and blue within a particular portion of conveyor 28 may be indicative of the amount of soil on conveyor 28. For example, an increase in the amount of red, green and/or blue within the particular portion of conveyor 28 may indicate an increase in the amount of soil on conveyor 28. An increase above a particular threshold value may indicate that conveyor 28 requires cleaning.

RGB detector 14 collects optical data from a particular portion of conveyor 28, e.g., from between two links of conveyor 28, related to the red, green, and blue color composition of the particular conveyor portion and converts the optical data to a format that is compatible with controller 12, e.g., a current or voltage if controller 12 requires an electrical input. Controller 12 receives the optical data and may access reference data 18 to make a comparison. Reference data 18 may include data collected by RGB detector 14 when conveyor 28 was determined to be clean (either subjectively or objectively). Controller 12 may determine a metric based on the comparison of the data to reference data 18, e.g., a percentage increase in the amount of red, green, and/or blue detected on the particular portion of conveyor 28 in comparison to reference data 18. If the metric exceeds a particular threshold value, e.g., a fifty percent increase in the amount of red, green and/or blue, controller 12 may determine that conveyor 28 requires cleaning.

In other examples, controller 12 receives a data set from RGB detector 14 for a plurality of data collection events and stores the data sets in data detection 20. After storing each of the plurality of data sets, controller 12 may increment a data collection counter. When the data collection counter reaches a particular threshold value, e.g., four data collection events (or some other predetermined number), controller 12 may access the data from data detection 20 and determine a metric for each data set. Controller 12 may then determine an average value for the metrics and may compare the average value to data stored in reference data 18 to determine whether the metrics exceed a particular threshold value and conveyor 28 requires cleaning. Controller 12 may also or alternatively analyze the optical data in other ways known of skill in the art to determine whether the conveyor requires cleaning.

In other examples, detector 14 may comprise a grayscale detector (e.g., a photodiode or other optical detector) that collects data that is based on the distribution of light intensity within a particular sample, e.g., a particular portion of conveyor 28. As with RGB detector 14, grayscale detector 14 may generate data indicative of the amount of soil on the conveyor 28. Controller 12 may determine whether conveyor 28 requires cleaning based on comparing grayscale data included in reference data 18 to the data received from grayscale detector 14.

In other examples, detector 14 may comprise an image capture device, such as a camera, that takes an image of a particular portion of conveyor 28. Controller 12 may receive the image from detector 14 and compare the image to a reference image stored in reference data 18. For example, controller 12 may determine a metric for each pixel of the image indicative of the color composition and/or the intensity of each pixel. Controller 12 may determine a corresponding metric for each pixel of the reference image and compare the metrics from each pixel of the image and each pixel of the reference image to determine whether the particular portion of conveyor 28 exhibits an increase in the color or intensity, which may indicate an increase in the amount of soil on the conveyor 28. Controller 12 may determine whether conveyor 28 requires cleaning based on comparing the image to the reference image.

If controller 12 determines that conveyor 28 requires cleaning, controller 12 may alert a user, e.g., an operator, a plant manager, maintenance personnel. The user may initiate cleaning of conveyor 28 in response to receiving the alert. Alternatively or additionally, controller 12 may automatically activate cleaning system 22 if controller 12 determines that conveyor 28 requires cleaning. Cleaning system 22 may, in some examples, be a lubrication system that applies wet or dry lubrication to one or more components of conveyor system 26 in order to reduce friction between the components, reduce the amount of soil present on the conveyor and/or increase efficiency of conveyor system 26.

Figure 3:
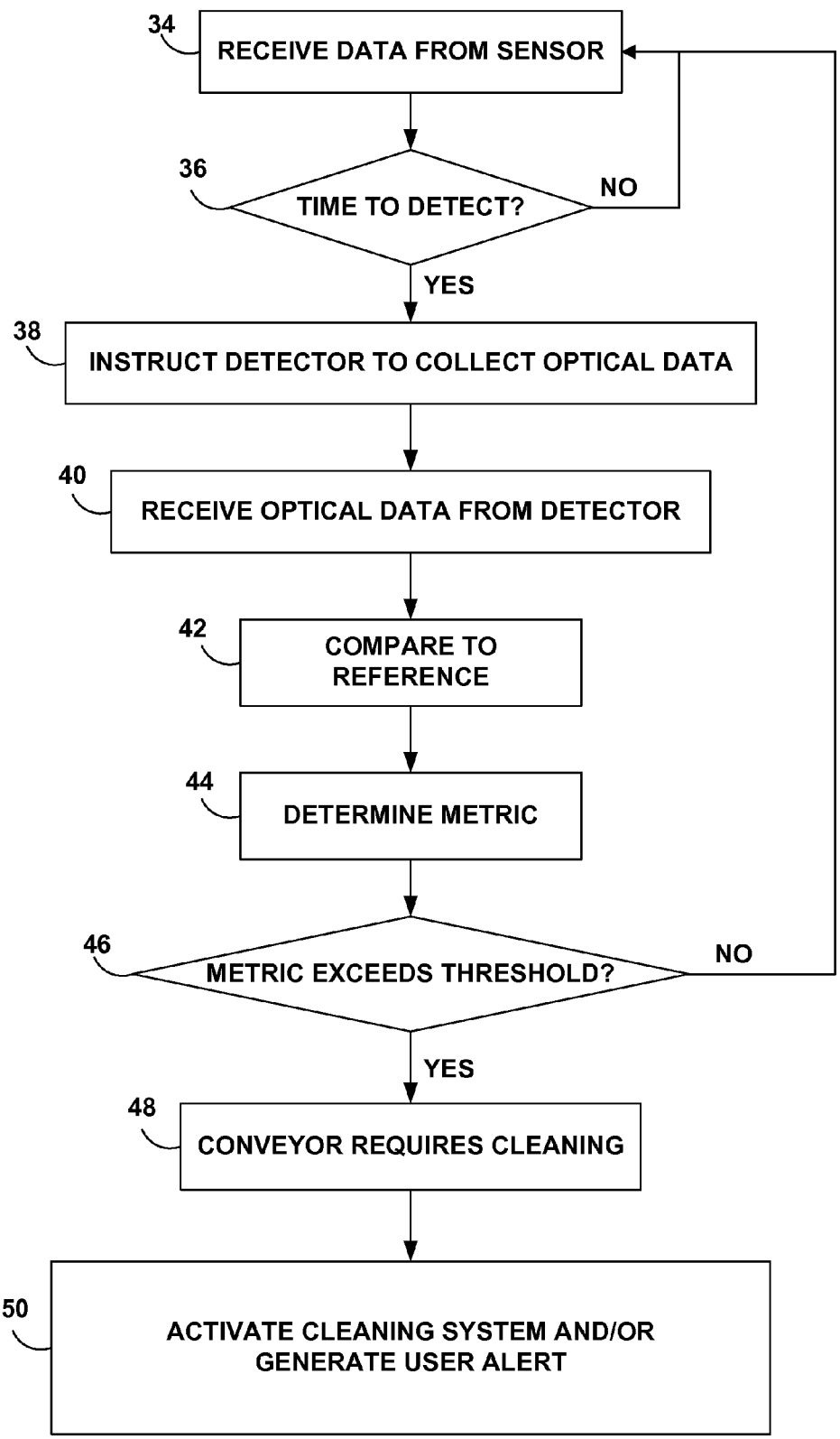
FIG. 3 is a flow diagram illustrating a technique for determining when a conveyor requires cleaning.

FIG. 3 is a flow diagram illustrating an example processes by which controller 12 may determine when conveyor 28 (FIG. 2) requires cleaning. Controller 12 receives data collected by sensor 10 (34). For example, controller 12 may receive data related to the current position of conveyor 28, from which controller 12 may determine whether the conveyor is an appropriate position for capture of optical data indicative of the amount of soil on the conveyor. Controller 12 may alternatively or additionally receive data from sensor 10 indicating that a predetermined amount of time has elapsed. Controller 12 determines whether to instruct detector 14 to collect optical data based on the data received from sensor 10 (36). If controller 12 determines that it is an appropriate time to capture the optical data, controller 12 instructs detector 14 to collect optical data from conveyor 28 (38). If controller 12 determines that detector 14 should not collect optical data at this time, controller 12 continues to monitor and receive data from sensor 10 (34).

Controller 12 receives the optical data collected by detector 14 (40). Controller 12 may compare the optical data to reference data 18 (42), which may comprise data collected when conveyor 28 was determined to be clean. Controller 12 determines a metric based on the comparison of the optical data collected by detector 14 to reference data 18 (44). Controller 12 compares the metric to a particular threshold value to determine whether the metric exceeds a particular threshold value (46). If controller 12 determines that the metric does not exceed the particular threshold, controller 12 determines that the conveyor does not require cleaning and continues to monitor and receive data from sensor 10 (34). If controller 12 determines that the conveyor requires cleaning, controller 12 may activate a cleaning system to clean conveyor 28 and/or generate a user alert indicating that conveyor 28 requires cleaning (50).

In other examples, controller 12 receives the optical data collected by detector 14, stores the data in data detection module 20, and increments a data collection counter based on storing the optical data in data detection module 20. Controller 12 monitors the data collection counter to determine whether the data collection counter has exceeded a particular threshold, e.g., to determine whether enough data sets have been stored or enough data has been collected. If controller 12 determines that the data collection counter has exceeded the threshold, controller 12 may determine metrics for an optical parameter for each of the stored data sets, determine an average value for the metrics, and compare the average value to reference data 18 in order to determine whether the difference between the average value and reference data 18 exceeds a particular threshold value, e.g., an increase in intensity of sixty percent, in order to determine whether conveyor 28 requires cleaning.

In some examples, the threshold setting and/or the "clean" reference setting may be adjusted by a user or service technician so that the maintenance system 8 may be adapted to different conveyor applications and environments.

Figure 4A:
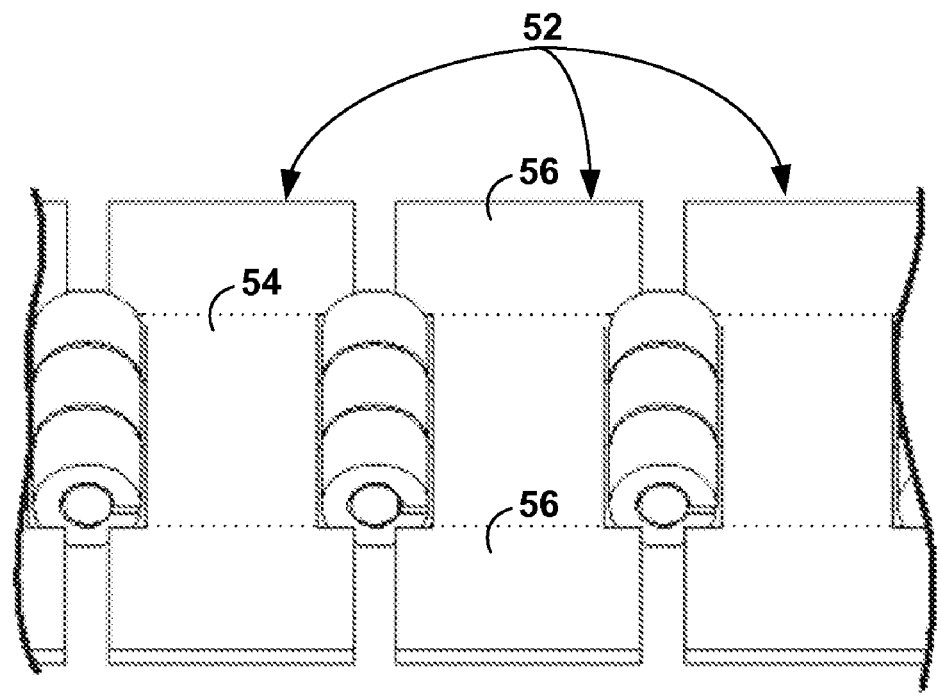
FIG. 4A is a diagram illustrating an inner surface of a conveyor.

FIG. 4A is a diagram illustrating a portion of the inner surface of conveyor 28 that directly contacts drive shaft 30 when conveyor 28 is rotating as a component of conveyor system 26 (FIG. 2). FIG. 4A illustrates the inner surface of three links 52 of conveyor 28, each comprising an inside area 54 and outside areas 56. The amount of soil on the surfaces of inside area 54 and/or outside areas 56 may be indicative of the amount of soil on most or all portions of the inner surface of conveyor 28. Consequently, in some examples, detector 14 may be positioned to collect optical data from inside area 54 and/or outside areas 56 in order to determine whether conveyor 28 requires cleaning.

In some examples, detector 14 may be positioned proximal to the inner surface of conveyor 28 in order to collect optical data from inside area 54 and/or outside areas 56. In examples in which detector 14 is positioned proximal to the inner surface of conveyor 28, detector 14 may be equipped with a cleaning tool or system in order to ensure that the data collected by detector 14 is not influenced by dirt or debris that may accumulate on the surface of detector 14. Alternatively or additionally, a user may clean detector 14 periodically.

Figure 4B:
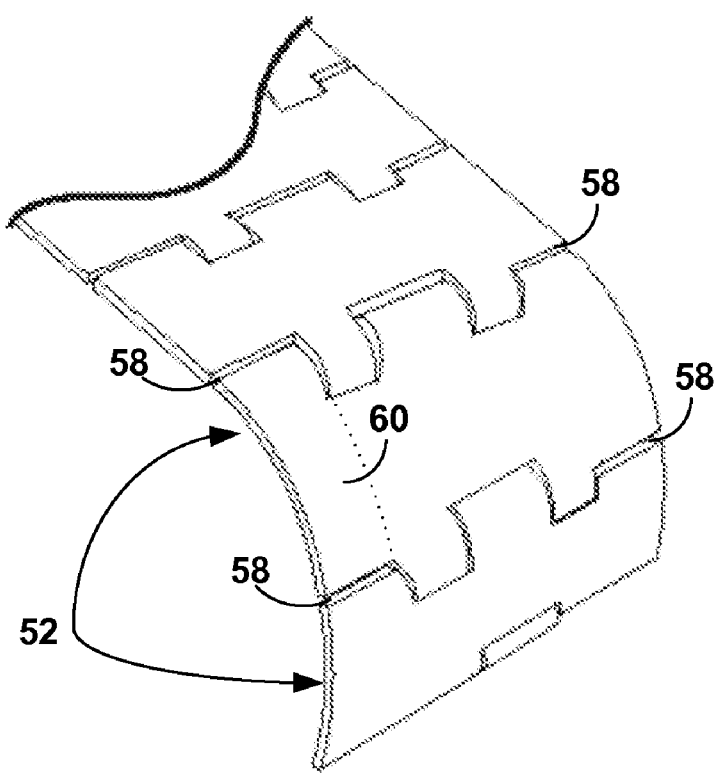
FIG. 4B is a diagram illustrating an outer surface of a conveyor.

FIG. 4B is a diagram illustrating a portion of the outer surface of conveyor 28 that directly contacts the cargo being transported by conveyor system 26 and does not directly contact drive shaft 30. FIG. 4B illustrates the outer surface of links 52 of conveyor 28. Openings 58 between links 52 may appear when links 52 are in the process of rotating around drive shaft 30.

Sensor 10 may, in some examples, sense openings 58 and controller 12 may determine that conveyor 28 has rotated to a particular position or has rotated a particular distance, e.g., one full revolution, based on sensing openings 58. For example, if conveyor 28 comprises a particular number of openings 58, e.g., 100 openings, controller 12 may determine that conveyor 28 has rotated one full revolution based on determining that sensor 10 has sensed the particular number of openings, e.g., 100 openings in this example.

Sensor 10 may, in some examples, comprise an inductive or capacitive sensor, as discussed with respect to FIG. 2. In other examples, sensor 10 may comprise an optical sensor, e.g., an opto-interrupter, which senses the reflectivity of a portion of conveyor 28. Controller 12 may determine that changes in the reflectivity of the portion of conveyor 28 may be indicative of movement or rotation of conveyor 28. For example, sensor 10 may be positioned to sense the reflectivity of the outer edges, e.g., outer edge 60, of the outer surface of conveyor 28 because openings 58 may have a different reflectivity than the outer surface of links 52. Controller 12 may determine that openings 58 have rotated past sensor 10 a particular number of times based on changes in the reflectivity of the outer edges of the outer surface of conveyor 28 as the outer edges rotate past sensor 10. Consequently, controller 12 may determine that conveyor 28 has rotated to a particular position or has rotated a particular distance. Alternatively or additionally, sensor 10 may sense reflectivity of a portion of drive shaft 30 in order to determine whether conveyor 28 has rotated to a particular position or has rotated a particular distance.

Alternatively or additionally, a reflective material or other visible marker may be applied to a portion of conveyor system 26 that rotates or moves during operation, e.g., drive shaft 30 or a portion of links 52. Sensor 10 may be positioned to sense presence of the reflective material or other visible marker. Controller 12 may determine that conveyor 28 has rotated to a particular position or has rotated a particular distance based on sensing of the reflective material or other visible marker.

Alternatively, sensor 10 may detect presence of the openings 58 between links 52, which may trigger capture of the optical data indicative of the amount of soil on the conveyor. On some conveyor systems, such as a link system shown in FIGS. 4A and 4B, soil may tend to collect on the edges of the links at the openings 58. Openings 58 may accumulate soil more quickly than the outer or inner surfaces of conveyor 28, and optical data captured with respect to openings 58 may therefore provide a more accurate indication of when conveyor 28 requires cleaning. Thus, in some examples, the optical data indicative of the amount of soil on the conveyor may be captured with respect to the times when openings between links are relatively more exposed as the conveyor rotates around the drive shaft. Controller 12 may compare optical data collected by detector 14 from openings 58 to reference data 18 collected and stored when openings 58 were determined to be clean. Alternatively or additionally, detector 14 may compare optical data collected from openings 58 to optical data collected from the outer or inner surfaces of conveyor 28 to determine whether conveyor 28 requires cleaning, instead of comparing the optical data to reference data 18.

Alternatively or additionally, instead of sensing the position of the conveyor, sensor 10 may comprise a time-keeping device such as a clock or a timer. Controller 12 may receive data from sensor 10 related to the passing of time. Controller 12 may then determine that a particular amount of time has elapsed, e.g., one minute, and that, consequently, detector 14 may collect optical data from conveyor 28.

Various examples of the invention have been described. These and other examples are within the scope of the following claims.

The invention claimed is:

1. A method comprising:
   determining that a conveyor is in a particular physical position;
   collecting data related to at least one optical parameter from the conveyor based on determining that the conveyor is in the particular physical position, wherein the at least one optical parameter comprises at least one of a color composition of a portion of the conveyor or a grayscale intensity of the portion of the conveyor;
   comparing the collected data to reference data related to the at least one optical parameter; and
   determining whether the conveyor requires cleaning based on the comparison.

2. The method of claim 1, further comprising determining that a particular amount of time has elapsed, wherein collecting data comprises collecting data based on determining that the particular amount of time has elapsed.

3. The method of claim 1, wherein determining that the conveyor is in the particular physical position comprises sensing an opening between two links of the conveyor.

4. The method of claim 1, wherein determining that the conveyor is in the particular physical position comprises determining that the conveyor has rotated a particular distance.

5. The method of claim 1, further comprising:
   determining that the conveyor is clean; and
   collecting the reference data when the conveyor is clean.

6. The method of claim 1, further comprising at least one of activating a cleaning system or alerting a user based on determining that the conveyor requires cleaning.

7. The method of claim 1, further comprising:
   incrementing a data collection counter based on collecting data;
   determining that the data collection counter has reached a particular threshold value; and
   determining at least one of an average, maximum, minimum, or range value based on metrics for at least two sets of data based on determining that the data collection counter has reached the particular threshold value, wherein determining that the conveyor requires cleaning based on the metrics comprises determining that the conveyor requires cleaning based on the at least one of the average, maximum, minimum, or range value.

8. A system comprising:

a detector that collects optical data related to at least one optical parameter from a conveyor based on a determination that the conveyor is in a particular physical position, wherein the at least one optical parameter comprises at least one of a color composition of a portion of the conveyor or a grayscale intensity of the portion of the conveyor;

a memory that stores reference data related to the at least one optical parameter; and a controller that determines when the conveyor is in the particular physical position, compares the optical data to the reference data, and determines whether the conveyor requires cleaning based on the comparison.

9. The system of claim 8, further comprising a sensor that collects sensor data concerning the physical position of the conveyor, wherein the controller determines when the conveyor is in the particular physical position based on the sensor data.

10. The system of claim 9, wherein the sensor comprises at least one of an inductive sensor, a capacitive sensor, an optical sensor, or a timing sensor.

11. The system of claim 9, wherein the sensor comprises one of an RGB sensor or a grayscale sensor.

12. The system of claim 9, wherein the sensor senses openings between links of the conveyor.

13. The system of claim 12, wherein the detector collects optical data from at least one opening between links of the conveyor.

14. The system of claim 8, wherein the detector collects optical data from an inner surface of the conveyor.

15. The system of claim 8, wherein the detector collects optical data from an outer surface of the conveyor.

16. A system comprising:

a detector configured to collect optical data related to at least one optical parameter from a conveyor based upon a determination that the conveyor is in a particular physical position;

a memory that stores reference data related to the at least one optical parameter;

a sensor configured to collect data related to a physical position of the conveyor; and a controller that determines that the conveyor is in the particular physical position based on data collected by the sensor, controls the detector to collect the optical data based on a determination that the conveyor is in the particular physical position, compares the collected optical data to the reference data, and determines whether the conveyor requires cleaning based on the comparison.

17. The system of claim 16, wherein the controller determines that the conveyor is in a particular physical position by at least sensing an opening between two links of the conveyor based on the data collected by the sensor.

18. The system of claim 16, wherein the controller determines that the conveyor is in a particular physical position by at least determining that the conveyor has rotated a particular distance based on the data collected by the sensor.

* * * * *